United States Patent [19]
Röhl

[11] Patent Number: 4,646,219
[45] Date of Patent: Feb. 24, 1987

[54] INTRINSICALLY SAFE POWER SUPPLY WITH A CURRENT REGULATOR

[75] Inventor: Wolfgang Röhl, Berlin, Fed. Rep. of Germany

[73] Assignee: Siemens Aktiengesellschaft, Munich, Fed. Rep. of Germany

[21] Appl. No.: 794,962

[22] Filed: Nov. 4, 1985

Related U.S. Application Data

[63] Continuation of Ser. No. 706,915, Feb. 28, 1985, abandoned.

[30] Foreign Application Priority Data

Dec. 16, 1981 [DE] Fed. Rep. of Germany ....... 3150398

[51] Int. Cl.$^4$ ............................................ H02M 3/335
[52] U.S. Cl. ........................................ 363/21; 361/18; 363/56
[58] Field of Search .................. 361/90, 91, 92, 18, 361/56, 100; 363/21, 54, 53, 56, 50, 52

[56] References Cited

U.S. PATENT DOCUMENTS

| | | | |
|---|---|---|---|
| 3,371,262 | 2/1968 | Bird et al. | 361/18 |
| 3,445,751 | 5/1969 | Easter | 361/18 |
| 3,515,974 | 6/1970 | Stich | 321/2 |
| 3,743,887 | 7/1973 | Keough et al. | 363/54 X |
| 3,982,173 | 9/1976 | Berry et al. | 361/18 |
| 4,013,938 | 3/1977 | McCoy | 363/56 |
| 4,017,781 | 4/1977 | Müller | 321/2 |
| 4,037,271 | 7/1977 | Keller | 363/21 |
| 4,124,884 | 11/1978 | Episcopo | 363/21 |
| 4,130,862 | 12/1978 | Holt | 363/21 X |
| 4,389,702 | 6/1983 | Clemente et al. | 363/21 |

FOREIGN PATENT DOCUMENTS

| | | |
|---|---|---|
| 2843093 | 9/1978 | Fed. Rep. of Germany . |
| 2298898 | 8/1976 | France . |
| 2031623 | 9/1978 | United Kingdom . |

*Primary Examiner*—Peter S. Wong
*Assistant Examiner*—D. L. Rebsch
*Attorney, Agent, or Firm*—Kenyon & Kenyon

[57] ABSTRACT

An intrinsically safe power supply arrangement with a current regulator is provided with a controlled semiconductor, coupled to a clock generator and coupled between a rectifier and a primary winding of a transformer, for periodically interrupting a DC current in response to a clock signal. A short-circuit switch is disposed between a secondary winding of the transformer and an output of the power supply arrangement. A choke is coupled to the short-circuit switch, and a voltage limiter is coupled to the choke. A current regulator, coupled between the voltage limiter and the output of the power supply arrangement, has a retrogressive current-voltage characteristic and a delay stage for producing a time-delayed rise of a selectable combination of current and voltage. A circuit element supplies a selectable input and output signal of the current regulator to an input of a voltage regulator. An output of the voltage regulator is coupled to the clock generator. A current measuring circuit coupled to the primary winding of the transformer and the clock generator limits the current supplied to the primary winding of the transformer in the event of a short-circuit on the secondary side of the transformer.

3 Claims, 5 Drawing Figures

INTRINSICALLY SAFE POWER SUPPLY WITH A CURRENT REGULATOR

This application is a continuation of application Ser. No. 706,915, filed Feb. 28, 1985, now abandoned.

BACKGROUND OF THE INVENTION

This invention relates generally to intrinsically safe power supply systems, and more particularly, to a power supply arrangement wherein rectified DC current is periodically interrupted by a clock-controlled semiconductor device connected in series with a primary winding of a transformer; the output of the power supply being provided at a secondary winding of the transformer which is provided with a regulator for limiting the output current and a shorting switch controlled in response to predetermined limits.

A power supply arrangement of the type described above is described in German Reference No. DE-A-28 43 093. The known power supply described in this reference is provided with multiply-redundant current and voltage limitations, and satisfies the stringent safety requirements of category "ia" of the European Standard No. EN 50020. This standard is met even though controlled semiconductors are used for limiting the current. This known power supply arrangement, however, operates with a relatively large dissipation loss which produces an undesirable temperature rise in the equipment. Moreover, such a temperature rise presents considerable difficulties in achieving theoretically approximated limits for protective currents and voltages.

It is, therefore, an object of this invention to achieve as nearly as possible the utilization of the power supply at the theoretical limits of intrinsical safety (UL-Standard No. 973, 3.8).

It is a further object of this invention to achieve such maximum utilization with load dissipation and with simple and inexpensive circuit design.

SUMMARY OF THE INVENTION

The foregoing and other objects are achieved by this invention which provides an intrinsically safe power supply arrangement of the type wherein rectified DC current is conducted through a primary winding of a transformer via a clock-controlled semiconductor device which periodically interrupts the DC current. The secondary winding of the transformer is connected to the output of the power supply and is provided with a regulator for limiting the output current and a shorting switch which operates in response to predetermined limits. In accordance with the present invention, the shorting switch is preceded by a choke followed by a voltage limiter.

In the event of a short circuit, the choke of the present invention limits the rate of current rise so that a current having a magnitude which would endanger the power supply arrangement cannot be developed during the time between the occurrence of the short circuit and the operation of the short-circuit switch. In this manner, no danger-causing effect results from the unavoidable delays which occur during the detection of a current rise, the issuance of a control command to a short-circuit switch, such as a thyristor, and the operation of the short-circuit switch. Voltage spikes which occur at the choke can be eliminated by known voltage-limiting means. Some devices which are suitable for this purpose include zener diodes, or a relatively small capacitor of suitable capacity. A general power limitation of the power supply apparatus can be ignored because the choke, in conjunction with the voltage limiter, safely controls the critical transients in the event of a short circuit.

In one embodiment of the invention, the power supply arrangement can be adapted to operate with a capacitive load. The difficulty in this mode of operation is that at the instant when a capacitor is connected to the protected power supply arrangement, a current begins to flow which is limited only by the line impedances. However, if the overcurrent disconnect device works without delay, then the equipment is switched off and therefore the capacitive load cannot be initiated, although continuous, or steady state, operation would be possible. This problem can be corrected if the current-limiting regulator is provided with a tripping point which is ahead of the response of the shorting switch. An additional margin of safety can be obtained by utilizing a retrogressive current-voltage characteristic of the current regulator. A retrogressive current-voltage characteristic is understood to mean a behavior in which the current and the voltage drop with increasing load, starting out from a limit of the current and voltage.

In connection with a retrogressive current-voltage characteristic, it has been found to be advantageous to provide delay stages at the secondary side of the transformer to achieve a time-delayed rise of the current and/or the voltage after a short circuit at the output is removed. This measure can be applied by itself to provide increased safety. However, the measure produces a particularly advantageous behavior of the power supply arrangement in conjunction with the retrogressive current-voltage characteristic.

A current-measuring device may be arranged in the primary circuit of the transformer and connected to the clock generator of the controlled semiconductor in the direction of a current limitation or disconnection in the event of a short circuit on the secondary side. If the output is short circuited, the shorting switch arranged in the secondary circuit responds, while at the same time, the voltage regulator endeavors to counteract a voltage drop. This occurs concurrently with an increase of the dissipation loss. The current measuring device disconnects the power supply apparatus and thereby protects the components.

If the intrinsically safe power supply arrangement of the type discussed hereinabove is equipped at its output with a control for limiting the current, problems occur with the voltage regulation, especially in embodiments where high accuracy is required. In the prior art, such problems have been corrected through the use of two voltage regulators, this corrective approach, however, is expensive and produces additional losses. In accordance with a further embodiment of the invention, these difficulties are avoided if a signal which appears at the input or the output of the current regulator can be conducted selectably to the voltage regulator depending upon the state of operation of the current regulator. This is achieved by a double-throw control switch which precedes the voltage regulator and switches between the output signal to the input signal of the current regulator when the current limitations sets in, so as to prevent an increase of the voltage ahead of the current regulator due to the intervention of the voltage regulator. In a further embodiment of the invention, a diode—rather than a double-throw control switch—is used to supply a selectable input and output signal of the current regulator to an input of the voltage regulator.

Overall efficiency can be improved if the voltage regulator is responsive to signals at the output of the power supply and operates on the primary circuit of the transformer. In this manner, the control loop includes practically the entire power supply system.

BRIEF DESCRIPTION OF THE DRAWINGS

Comprehension of the invention is facilitated by reading the following detailed description in conjunction with the annexed drawings, in which.

DETAILED DESCRIPTION

Figure 1:
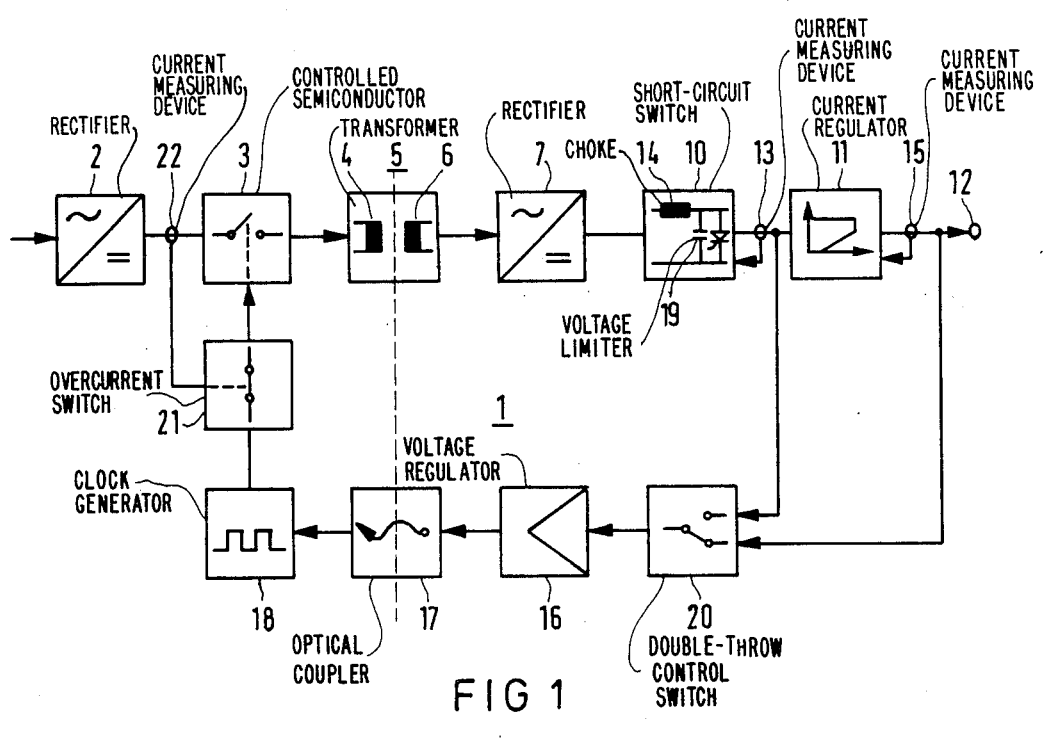
FIG. 1 is a block and line representation of an embodiment of a power supply system constructed in accordance with the principles of the invention.

FIG. 1 shows a block and line representation of an embodiment of a power supply arrangement which is generally designated 1 and which is constructed in accordance with the principles of the invention. In accordance with this specific illustrative embodiment, power supply arrangement 1 is provided at its input with a rectifier 2 which rectifies AC current from a network (not shown). The DC current which is produced at the output of rectifier 2 is periodically interrupted by a controlled semiconductor 3 which may be, for example, a thyristor or a transistor. This periodically interrupted current is conducted to a primary winding 4 of a transformer 5. The AC current which is induced in a secondary winding 6 of transformer 5 is DC-isolated from the network side, and is rectified again in a rectifier 7. This DC energy is provided at an output 12 of the power supply arrangement via a short circuit switch 10 and current regulator 11.

Short circuit switch 10 is responsive to a current measuring device 13 and is provided with a series choke 14. Series choke 14 is followed by voltage limiter 19. In one embodiment, a thyristor can serve as the short-circuit element. Current regulator 11 is responsive to a further current measuring device 15 and is designed to have a retrogressive current-voltage characteristic which is present at output 12. A voltage regulator 16 is responsive to the output signal at output 12 and operates on controlled semiconductor 3 in the primary circuit of transformer 5. In order to achieve DC isolation in the control circuit, the control signal is conducted to a clock generator 18 via an optical coupler 17.

As shown in FIG. 1, voltage regulator 6 is preceded by a double-throw control switch 20 which is connected at respective inputs thereof to output 12 and to receive a further voltage signal which is present at the input of current regulator 11. The double-throw control switch switches between the input and output signals of current regulator 11.

In the primary circuit of the power supply arrangement there is further inserted between controlled semiconductor 3 and clock generator 18 an overcurrent switch 21 which is responsive to a current-measuring device 22. As soon as the current at the input, which is measured by current-measuring device 22, exceeds a predetermined limit, which will be the case especially if short-circuit switch 10 responds, overcurrent switch 21 shuts down the energy transmission by blocking controlled semiconductor 3.

Figure 2:
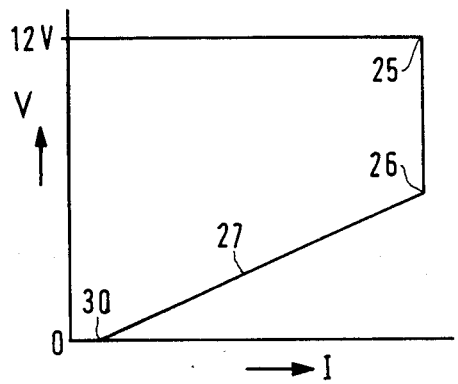
FIG. 2 is a graph of a retrogressive current-voltage characteristic.

FIG. 2 shows a characteristic graph of current-limiting regulator 11. In this graph, voltage V is plotted against current I. As shown in the figure, the voltage remains essentially constant up to a limit value of the current. This operating point, which is designated 25, corresponds to the maximum power delivered by the power supply arrangement. In this specific illustrative embodiment, operating point 25 corresponds to approximately 12 volts and 1.5 amps, and is therefore higher than known intrinsically safe power supply arrangements. If the load is increased beyond operating point 25, the voltage drops to an operating point 26 while the current remains practically unchanged. Higher loading beyond operating point 26 results in a decrease of the current and voltage along straight line 27 to a lower operating point 30 which may be in the order of milliamps. The characteristic of FIG. 2 is traversed undelayed with increasing load, while in the reverse direction, the current and the voltage increase with delay.

Figure 3:
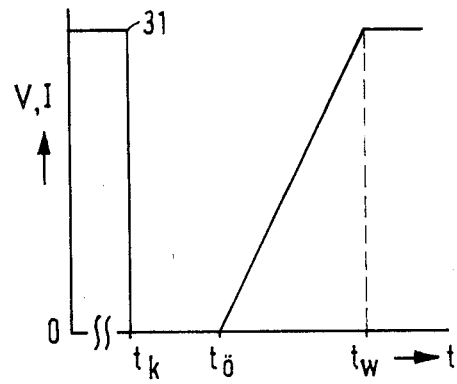
FIG. 3 is a plotted graph of a time-delayed current and voltage rise which can be applied alone or in conjunction with the retrogressive characteristic.

FIG. 3 shows a graph of a characteristic of current regulator 11 in the event of a short circuit. As shown in FIG. 3, beginning with an operating point 31, the current and voltage drop to a zero value at a time $t_k$ when a short circuit occurs and remains there until a time $t_o$. When the short circuit is removed at time $t_o$, the current and voltage then increase again gradually such that, at time $t_w$, the original voltage of operating point 31 is achieved once again. In accordance with this embodiment of the invention, the recurrence of the current and the voltage is shown to increase linearly. However, a nonlinear characteristic may be provided as long as the condition that the increase of the current and the voltage extend from a value of zero to a final value over a predetermined time interval. In FIG. 3, a minimal residual current which flows in the case of a short circuit is neglected.

In details of an embodiment of the power supply arrangement will be explained with respect to FIGS. 4A and 4B, which, when taken together, show a complete circuit diagram. Beginning at network terminals U and V, a line voltage of illustratively 220 volts AC is rectified by a rectifier 2 which is formed of diodes, and the resulting DC voltage is smoothened by means of capacitors C1 and C13. The DC voltage is applied by means of a power field-effect transistor V6 which is analogous to controlled semiconductor 3 in FIG. 1. The DC voltage is applied periodically to the primary winding of transformer 5. The clock frequency of this process is generated in a control oscillator which obtains an auxiliary voltage via capacitors C14 and C15, as well as a rectifier V2.

Figure 4A:
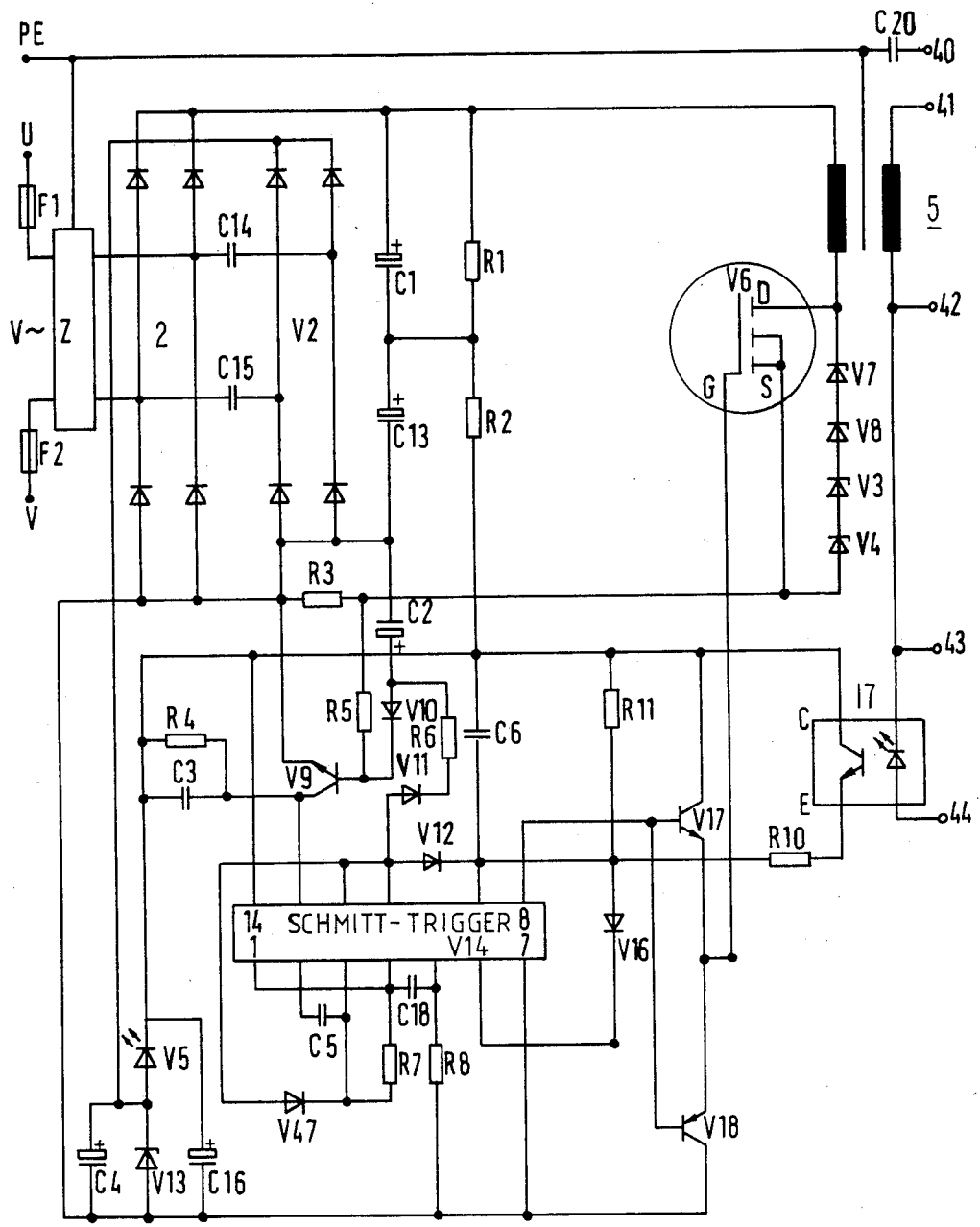
FIGS. 4A and 4B are combinable to show a complete circuit diagram of an embodiment of a power supply arrangement constructed in accordance with the invention.

The control oscillator of FIG. 4A, which is analogous to clock generator 18 of FIG. 1, comprises a sextuple-Schmitt trigger V14, capacitors C5, C6, and C18, diodes V12, V15, and V16, as well as resistors R7, R8, and R11. The duty cycle of the control oscillator is responsive to an optical coupler 17 and resistors R10 and R11. These circuit elements influence the discharge of capacitor C6, which is charged periodically via a diode V16, together with a spike pulse circuit formed by a capacitor C18 and a resistor R8.

Transistor V6 is included in a current limiting circuit of FIG. 4A—analogous to the combination of current-measuring device 22 and overcurrent switch 21 of FIG. 1 which further includes resistors R3, R4, R5, and R6, as well as capacitors C3 and C2, and semiconductors V9, V10, V11, V12, V45, and V14. The circuit operates such that if a certain voltage drop at resistor R3 is exceeded, transistor V9 goes into conduction and transistor V6 is cut off via Schmitt trigger V14 and diode V12. Thus, the current is limited to a certain value, illustratively to 0.6 amps. If this current limitation lasts longer than a predetermined period of time, for example, 0.3 seconds, then capacitor C2 is charged via resistor R6 and diode V11 so far that transistor V9 goes into conduction permanently, whereby the power supply arrangement is permanently turned off. In order to turn the power supply arrangement on again, it is necessary to disconnect the line voltage and to wait for capacitor C2 to discharge. After a certain period of time, illustratively 30 seconds, the power supply can be put in operation again. The turning-off process is made visible to the user by light signals. A light-emitting diode V38 which is arranged at the output is extinguished while a light-emitting diode V5 at the input side lights with reduced brightness.

Except for light-emitting diode V38, the circuitry described hereinabove is part of the primary circuit of the power supply arrangement, and is shown in FIG. 4A. This part of the circuit also contains the secondary winding of transformer 5, as well as circuit points 40–44, by which the circuit portions of FIGS. 4A and 4B are interconnected. In the secondary portion of power supply arrangement shown in FIG. 4B, the voltage which is induced in the secondary winding of transformer 5 is rectified via a diode 7 and smoothened by the combination of a capacitor C7, choke 14, and capacitor C9. A reference voltage source which is provided to facilitate regulation is formed by circuit elements V23, V24, V25, and V26, as well as resistors R14, R15, and R19.

Figure 4B:
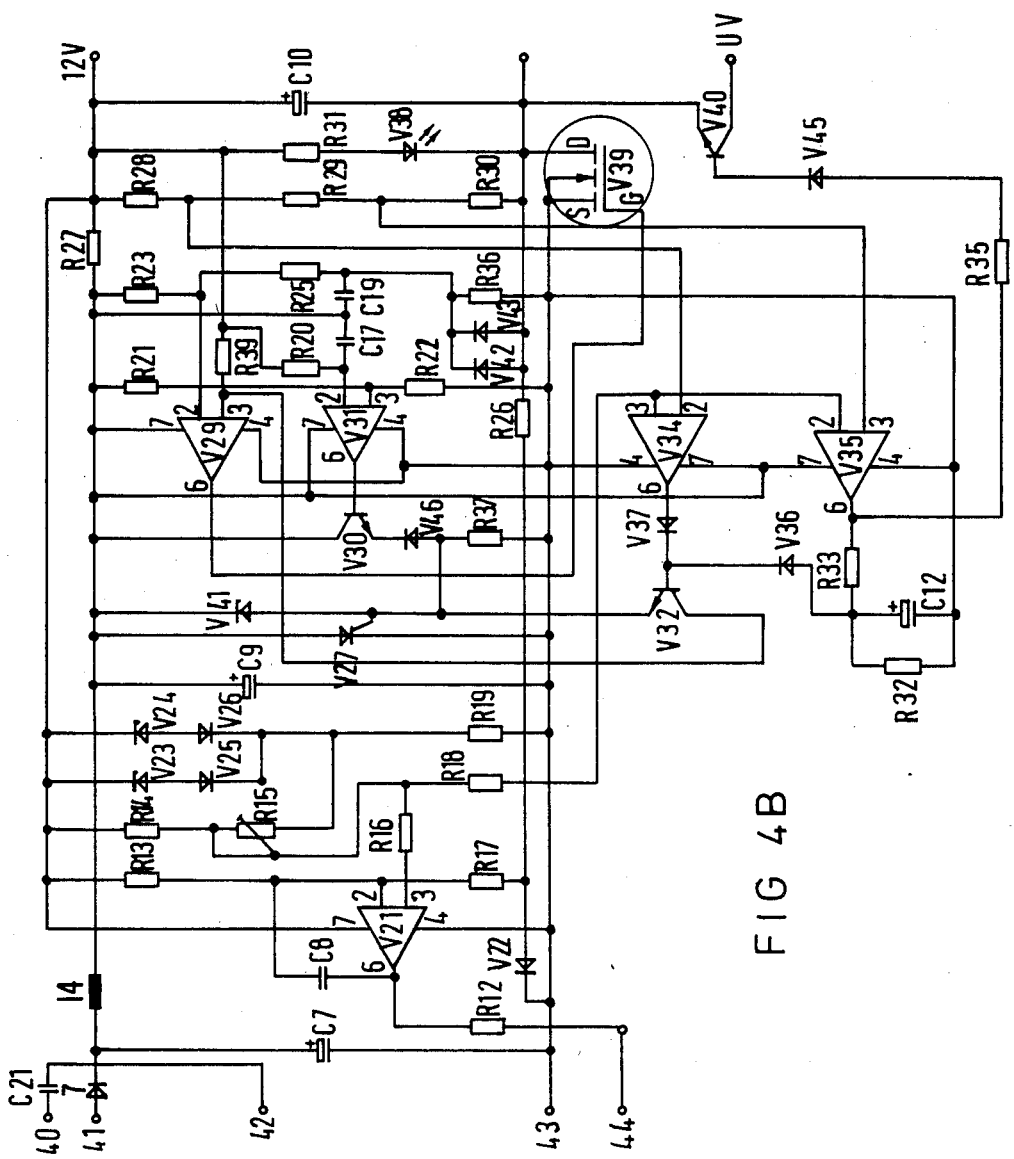

Voltage regulator 16 of FIG. 1 is shown in FIG. 4B as a circuit which includes operational amplifier V21, resistors R13, R17, and R26, and capacitor C8. An output voltage +V of the power supply arrangement is applied via resistors R13, R17, and R26 to an inverting input of an operational amplifier V21. These three resistors divide the output voltage in the ratio 1:2. If the resulting voltage is equal to the voltage of the reference voltage source, the operational amplifier V21, which is wired as an integrator with capacitor C8, is balanced. If the output voltage becomes larger, then the regulator integrates the voltage deviation and its output becomes more positive. The duty cycle of the control oscillator is reduced via the optical coupler 17 in the manner described, whereby the output voltage becomes smaller until the two input voltages at the operational amplifier V21 are equal again. If the output voltage is too small, the control works in the reverse; the duty cycle is made larger.

If during a fault situation the voltage exceeds the reference value by a given amount, for example, if the voltage is 13.5 volts instead of the nominal voltage of 12 volts, operational amplifier V34, which is supplied a control signal via a voltage divider formed by resistors R28, R29, and R30, causes a thyristor V27 to fire via a diode V37 and transistor V32. In this manner, the output voltage is short-circuited. Since the primary voltage of transformer 5 (in FIG. 4A) increases steeply, the primary current limiter becomes active and disconnects the power supply arrangement. As additional protection against overvoltages, the zener diode V41 is provided, and it can be rated so that it responds to a voltage of illustratively 15 volts.

The current regulator 11 of FIG. 1 is shown in FIG. 4B as a circuit comprising a measuring resistor R27 as well as a voltage divider formed of resistors R23, R25, and R36, as well as operational amplifier V29. Operational amplifier V29 controls a further power field-effect transistor V39 which influences the output current. In an embodiment of the present power supply arrangement, a value of 1.5 amps can be set as the limit for the current. The hereinabove described retrogressive characteristic is achieved by the combination of components V29, V39, R39, and R27. Resistors R23, R25, and R36, together with diodes V42 and V43 ensure that the current-voltage characteristic is retrogressive from one-half of the output voltage. In the event of a short circuit, capacitor C19 is discharged through diodes V42 and V43. If the short circuit is lifted, it is slowly charged up via resistor R36. Thus, the current limiting value is slowly regulated up from about 80 milliamps to 1.5 amps, as described hereinabove. The retrogressive characteristic of the power supply apparatus increases not only the internal protection, but also reduces, in the event of a short circuit, the dissipation loss that must be removed from transistor V39. In addition, it is possible to operate with non-ohmic loads which change their internal impedance considerably at the instant of switching on, for example, incandescent lamps or lasers.

Diode V22 of FIG. 4B provides a selectable one of an input signal of the current regulator and an output signal of the current regulator to the input of the voltage regulator. In particular, if diode V22 is conductive, the voltage appearing at source S of field-effect transistor V39 is applied via resistor R17 to input 2 of operational amplifier V21. If diode V22 is not conductive, then the voltage appearing at drain D of field-effect transistor V39 is applied via resistor R17 to input 2 of operational amplifier V21. If diode V22 is not conductive, then the voltage appearing at drain D of field-effect transistor V39 is applied via resistors R26 and R17 to input 2 of operational amplifier V21. Diode V22 of FIG. 4B is an alternative to the double-throw control switch 20 that is shown in block diagram form in FIG. 1.

The combination of short-circuit switch 10 and current-measuring device 13 of FIG. 1 is shown in FIG. 4B as a circuit that includes operational amplifier V31, thyristor V27, transistor V30, Zener diode V46, and choke 14.

If, in the event of a failure of the current regulator, the permissible current of 1.5 amps is exceeded, and if it reaches a value of illustratively 1.7 amps, the operational amplifier V31 causes thyristor V27 to be fired via transistor V30 and zener diode V46 so as to produce an immediate short circuit of the output voltage. The limitation of the rate of current rise through choke 14 is important and has several advantages. In the event of a direct short circuit of the output of the power supply arrangement, thyristor V27 is fired, and choke 14 limits the current rise. The unavoidable delay which results from the preparation of the firing command and the firing delay of thyristor V27 therefore remains without influence upon the protection.

Upon sudden current changes, for example, especially if a short circuit at the output is lifted, voltage spikes are produced at choke 14. These are eliminated by capacitor C9. Since a relatively small capacity is sufficient for this purpose, intrinsical safety is not jeopardized. On the other hand, choke 14 allows the use of a relatively large filter capacitor C7 and, together with capacitor C8, contributes to the filtering.

In addition to the foregoing, the power supply arrangement described herein provides an undervoltage tripping facility which responds if the normal output voltage of 12 volts drops to about 10.5 volts. This results in part from the operation of a voltage divider consisting of resistors R28, R29, and R30, as well as operational amplifier V35 and diode V36, and transistor V32. Resistors R33 and capacitor C12 perform a desired delay of the disconnect action. This is again accomplished via thyristor V27.

Although the invention has been described in terms of specific embodiments and applications, it is to be understood that persons skilled in the art, in light of this teaching, can generate additional embodiments without departing from the spirit or exceeding the scope of the claimed invention. Accordingly, the drawings and descriptions in this disclosure are proffered to facilitate comprehension of the invention and should not be construed to limit the scope thereof.

What is claimed is:

1. In an intrinsically safe power supply arrangement of the type having an input and an output, the output connectable to a load; a transformer having a primary winding and a secondary winding, the secondary winding being coupled to the output of the power supply arrangement; a rectifier, disposed between the primary winding of the transformer and the input of the power supply arrangement, for converting an AC input current into a DC current; a clock generator for generating a clock signal; a controlled semiconductor, coupled to the clock generator and coupled between the rectifier and the primary winding of the transformer, for periodically interrupting the DC current in response to the clock signal; and a short-circuit switch disposed between the secondary winding of the transformer and the output of the power supply arrangement and controllable in response to predetermined limits, the improvement comprising:

a choke, coupled between the secondary winding of the transformer and the short-circuit switch, for limiting the rate of current rise;

a voltage limiter coupled to the choke, the voltage limiter suppressing voltage spikes occurring at the choke and, in conjunction with the choke, safety controlling critical transients in the event of a short circuit; and a current regulator, coupled between the voltage limiter and the output of the power supply arrangement, for limiting the current provided at the output of the power supply arrangement, the current regulator having (1) a retrogressive current-voltage characteristic such that the current and voltage appearing at the output of the power supply arrangement drop with increasing load, starting out from a limit value of current and voltage; and (2) a delay stage for producing a time-delayed rise of a selectable combination of current and voltage at the output of the power supply arrangement after a short circuit at the output of the power supply arrangement is removed.

2. The power supply arrangement of claim 1 wherein there is further provided current measuring means coupled to the primary winding of the transformer and to the clock generator of the controlled semiconductor device so as to limit the current supplied to the primary winding of the transformer in the event of a short-circuit on the secondary side of the transformer.

3. The power supply arrangement of claim 1 wherein there are further provided:

a voltage regulator for regulating a voltage supplied at an input to the voltage regulator;

means for connecting an output of the voltage regulator to the clock generator; and means coupled between an input of the current regulator and an output of the current regulator, and further coupled to the input of the voltage regulator, for supplying a selectable one of an input signal of the current regulator and an output signal of the current regulator to the input of the voltage regulator.

* * * * *